United States Patent Office 3,255,018
Patented June 7, 1966

3,255,018
ADHESIVE CHEWING GUM, COMPOSITIONS AND METHODS FOR PREPARING SAME
Arthur J. Comollo, Middlesex County, N.J., assignor to Wm. Wrigley, Jr., Co., Chicago, Ill., a corporation of Delaware
No Drawing. Filed June 22, 1962, Ser. No. 204,638
45 Claims. (Cl. 99—135)

This invention relates to chewing gum of unique properties, and particularly to such gum having greatly modified properties with respect to adhesion to natural teeth, artificial teeth, and dental prosthetic devices, to compositions and components for use in such chewing gum and to methods of making and utilizing such compositions and components.

The use of chewing gum has been steadily increasing throughout the world, but one characteristic which prevents many people from using and enjoying chewing gum is its tendency to adhere to certain types of dentures and artificial teeth. The problem is greatest with acrylic plastics which are widely used in filling and denture compositions, since chewing gum adheres much more strongly to these materials. The processes employed in purifying natural gums (which are important and desirable constituents of many chewing gum bases) accentuate their adhesive nature by removing certain materials, such as tannins, which are normally present. The increasing use of synthetic products such as estergums, vinyl polymers, synthetic elastomers and petroleum waxes in the manufacture of gum base further increases the problem of adhesion of chewing gums to acrylic surfaces in the mouth.

Numerous attempts have been made to incorporate additives which would improve the freeness of chewing gum in the mouth. Such diverse materials as lecithin (U.S.P. 2,197,719), lanolin (U.S.P. 2,197,718) and silicone oils (U.S.P. 2,761,782) have been recommended for this purpose. But for various reasons, the prior art has not satisfactorily solved its problems.

Among the objects of the present invention is the production of chewing gum having reduced adhesion to normal and artificial teeth and prosthetic dental structures and particularly exhibiting such property over the normal duration of the use of such gum.

Other objects include compositions and components particularly useful in production of chewing gum of the stated properties and methods of making such gum, compositions and components.

Still further objects and advantages will appear from the more detailed description given below, it being understood that such description is given by way of explanation, and not limitation, since various changes may be made therein by those skilled in the art without departing from the scope and spirit of the present invention.

In accordance with the present invention, it has been found that tannic acid (gallotannin) exhibits an outstanding ability to reduce adhesiveness of chewing gum towards dental prosthetic devices including synthetic dentures and teeth, particularly acrylic surfaces, as well as natural tooth surfaces in the mouth. Whereas ordinary chewing gum tends to adhere to dentures, fillings, and caps fabricated for example from polymethyl methacrylate, gum containing even a relatively small amount of tannic acid exhibits a remarkable lack of adhesion towards acrylic dental structures. This property will more particularly be referred to hereinafter under the term abherence or some form of that word.

Although it is desirable to use pure tannic acid to produce chewing gum which will not adhere to acrylic surfaces in the mouth, other materials containing tannic acid or other types of water-soluble, hydrolyzable tannis may also be employed. For example, the dried and powdered extracts from chestnut (*Castanea vesea*), myrobalans (*Terminalia chebula*), or an extract of the bark of the Douglas fir may be used in place of tannic acid in amounts commensurate with their active tannin content. In this specification, the terms tannic acid and soluble tannins are employed, occasionally in an equivalent manner, but it should be noted that while soluble tannins may be satisfactorily used in the practice of the invention, pure tannic acid (gallotannin) is the agent of choice. At the same time, where tannic acid is specifically mentioned, it should be borne in mind that the soluble, hydrolyzable tannins, and materials containing them may, by appropriate adjustment, as in proportions, be used in its place. Or mixtures of any of these effective agents may be employed.

Tannic acid is very soluble in water and is rapidly extracted from chewing gum during mastication, consequently the duration of its efficacy is limited. It is desirable to extend this period of activity to cover the normal duration of the chew, which is usually considered to be from forty-five minutes to one hour. What is particularly desired is what may be called a depot effect in that the tannic acid or similar component is released at a regulated slow rate. It has been discovered that tannic acid in the presence of various polymeric materials is extracted from the gum at a much slower rate. This modification greatly prolongs the abhesive activity of tannic acid in chewing gum. Moreover, these mixtures are essentially tasteless in contrast to the astringency manifested by tannic acid when it is used in chewing gum by itself.

It has been found that a wide variety of polymeric materials contribute these improvements to tannic acid, and other soluble hydrolyzable tannins. Materials which are effective in combination with tannic acid include for example; polyvinyl alcohol, polyvinyl pyrrolidone, starch, methyl cellulose, hydroxyethyl cellulose and gelatin. All of these polymers are hydrophilic and may be swollen with or dissolved in water; and they all contain a plurality of sites where hydrogen-bonding may occur. When made into a heavy paste or gel with water, these polymers form hydrogen-bonded adducts with the tannic acid, thereby reducing its water solubility and decreasing the rate at which it is extracted from the gum. In order to facilitate their addition during the manufacture of chewing gum, these gels may be softened or plasticized as with the usual polyhydric alcohols such as glycerine, propylene glycol, diethylene glycol, mixtures of such polyhydric alcohols, or other appropriate plasticizers and mixtures. Desirably the plasticizers are cosolvents which act with the water to give solutions or gels with higher viscosity than is obtainable with water alone. These plasticizers, as with all chewing gum components, should be substantially nontoxic and acceptable for use in such compositions.

It should be understood that these and other explanations offered for actions herein are based on observations and tests. Insofar as theoretical explanations are given, the observations are not to be limited thereby since the observations are demonstrable.

The various polymeric materials which may be used to control the rate of release of tannic acid from chewing gum do not have an identical ability to enter into hydrogen-bond formation with tannic acid. In some cases, the adduct formed between tannic acid and the polymeric substrate will be quite stable and the rate of release of the tannic acid will be very slow. Thus in general, stability is reflected by the rate of release. Extremely stable adducts are formed, for example, between tannic acid and polyvinyl pyrrolidone. Methyl cellulose is an extremely effective acceptor of protons and holds the tannic acid, but not so strongly as polyvinyl pyrrolidone. In other cases, the adducts will have considerably less stability and will release tannic acid very quickly, as in combinations employing starch. The stability of the polymer-tannic acid adduct depends upon chemical structure, average molecular weight, and other factors associated with the polymer employed. Thus, the stability of the adduct and the rate of tannic acid release may be varied over a considerable range by proper selection of the polymer.

Gelatin has been found to be especially useful in preparing adducts with tannic acid for use as abhesive agents in chewing gum. Two types of edible gelatin, type A and type B, are commercially available. Type A gelatin is characterized by a high isoelectric point (pH 7.0–9.0) and a strong acid-binding character which reflects the presence of a high proportion of basic substituents. Compared to the type A material, type B gelatin has a lower isoelectric point (pH 4.7–5.0) and less ability to bind acid moieties. Both types of gelatin are available in a wide range of molecular weights which parallel the bloom values (50–300) of the various grades with average gelatins ranging from 125 to 200.

Adducts formed from tannic acid and the various polymeric substrates may have compositions covering a range of ratios of these two components. Thus it is possible to prepare adducts with a high proportion of polymer and a minor amount of tannic acid as well as adducts in which the tannic acid is the major component. The examples presented illustrate varying cases. Similar considerations apply to the tannic acid-gelatin adducts. For practical reasons, the proportion of gelatin to tannic acid are the same, irrespective of the type of gelatin employed, in the examples given below. It should be understood that greater or lesser amounts of tannic acid may be incorporated into either type of gelatin-tannic acid adduct, but, that for a given ratio of gelatin to tannic acid, the rate of release of the acid, on mastication of the gum containing it, is always slower for the adduct prepared from type A gelatin.

It has been found that the glycerine-plasticized adduct of tannic acid with, for example, a relatively low molecular weight type B gelatin (90 bloom), when used as an abhesive agent in chewing gum, begins to release its tannic acid soon after the chewing gum has become partially hydrated. A similar composition prepared from for example, a high molecular weight type A gelatin (275 bloom), on the other hand, does not begin to release tannic acid until the gum is fully hydrated and most of the solubles present in the gum have been removed. The type A adduct, because of the strong acid-binding character of the gelatin employed, releases its tannic acid slowly over an extended period of time. By using both types of gelatin-tannic acid adducts, together with a small amount of free tannic acid, we are able to prepare chewing gums which are exceptionally free at all stages of the chew to natural teeth, dentures and artificial teeth, especially those made from acrylic resins. The properties of the system may be adjusted by variation in the amounts of the adducts and free tannic acid, one to the other. A number of combinations of the components and their relative proportions is possible.

The polymer-tannic acid adducts may be prepared in a number of ways. A double-arm mixer of the Werner-Pfleiderer type may be employed, as illustrated in Examples 1–5. Proportions are by weight unless otherwise indicated.

Example 1

Polyvinyl alcohol ("Elvanol" 52–33) _____ 30
$H_2O$ _____ 55
Tannic acid _____ 20

Thirty parts of polyvinyl alcohol is charged into a double-arm stainless steel mixer. The mixer is started and 55 parts of water is added slowly, care being taken to distribute the liquid evenly throughout the mass. The plastic mixture is agitated until a smooth, tough gel has been produced. Twenty parts of tannic acid is then added slowly and mixing continued until the product is homogeneous. No heat is supplied to the mixer; frictional heat is generated within the mass which facilitates the preparation of the material. About 100 parts of product is obtained, some of the water having been evaporated during the mixing process. The product sets to a tough gel at room temperature.

In a similar manner, polymer-tannic acid adducts may be prepared using cornstarch, methyl cellulose, or polyvinyl pyrrolidone, in place of the polyvinyl alcohol. The amount of water employed in each case is sufficient to form a mass which may be readily mixed to homogeneity in the mill. For example the following components may be treated exactly as in Example 1 to produce the polymer-tannic acid adducts of cornstarch, methyl cellulose and polyvinyl pyrrolidone respectively.

1a
Cornstarch _____ 40
$H_2O$ _____ 25
Tannic acid _____ 20

1b
Methyl cellulose (15 cps.) _____ 15
$H_2O$ _____ 25
Tannic acid _____ 20

1c
Polyvinyl pyrrolidone _____ 30
$H_2O$ _____ 25
Tannic acid _____ 20

In order to facilitate addition of the adducts to a gum batch it is advantageous to soften the gel, either by warming, or by the addition of a plasticizer as shown in the following examples.

Example 2

Gelatin (type A, 275 bloom) _____ 15
$H_2O$ _____ 12.5
Tannic acid _____ 10
Glycerine _____ 26

Into a stainless steel, double-arm Abbe mixer is charged 15 pounds of gelatin (type A, 275 bloom). 12.5 pounds of water is added slowly, care being taken to insure even distribution of moisture throughout the batch. The temperature is gradually raised to 80° C., with agitation, the batch becoming a smooth, viscous fluid. With the heat off, 10 pounds of powdered tannic acid is then sifted into the mass and thoroughly mixed, 26 pounds of glycerine is added to the mass, slowly and in small portions at first —more rapidly as the viscosity of the product is reduced. Heat is supplied intermittently to the charge to offset the cooling effect of the glycerine, and, when the batch is completely smooth and homogeneous, the product is discharged at a temperature of 82° C. The product, on cooling, sets to a firm, light tan gel.

The above given composition exemplifies what are considered to be optimum proportions, and greater amounts of tannic acid are unnecessary.

Example 3

Gelatin (type B, 90 bloom) _____ 15
$H_2O$ _____ 12.5
Tannic acid _____ 10
Glycerine _____ 26

A gelatin-tannic acid adduct may be prepared as shown in Example 2, using type B gelatin (90 bloom). This grade of gelatin is of fairly low molecular weight and the final product is fluid enough to discharge from the mixer at 70° C. The fluid product is passed into storage containers through a screen (18 x 14 mesh) to insure freedom from small particles of swollen polymer. This product sets to a gel which is somewhat darker in color than the product of Example 2.

Example 4

| | |
|---|---|
| Gelatin (type B, 90 bloom) | 30 |
| $H_2O$ | 25 |
| Tannic acid | 20 |
| Propylene glycol | 52 |

Thirty parts of type B gelatin (90 bloom) is charged to a double-arm mixer and hydrated with 25 parts of water. The charge is gradually heated to 170° F., with agitation, the hydrated mass changing to a smooth, viscous solution. 20 parts of tannic acid is slowly added and the mixture agitated until homogeneous. 52 parts of propylene glycol is added slowly and, when mixing is complete, the product is discharged at 170° F. The product sets to a gel which is slightly softer than the corresponding material prepared with glycerine.

The adduct between tannic acid and the high bloom type A gelatin, plasticized with propylene glycol, may also be prepared as shown in Example 4.

As an example of a composition of the type of Example 4 which illustrates the use of a dried, powdered extract, such as from Douglas fir bark, and including a glycerine plasticizer, the following Example 4A is given.

Example 4A

| | |
|---|---|
| Gelatin | 30 |
| $H_2O$ | 25 |
| Dried, powdered extract of Douglas fir bark | 20 |
| Glycerine | 52 |

This composition may be produced by the same method as for Example 4 above making the necessary substitution of components as indicated. In lieu of the Douglas fir bark component, dried, powdered extracts of myrobalans or chestnut may be substituted and compounded in the same proportions and procedure.

As previously noted, chewing gum exhibiting freeness to natural and artifical teeth and dentures particularly acrylic dentures, at all stages of the chew can be prepared by incorporating tannic acid adducts made from both high bloom type A and low bloom type G gelatins. I have found it possible to prepare an effective product which combines both types of adducts, as shown in the following example.

Example 5

| | |
|---|---|
| Gelatin (type A, 275 bloom) | 15 |
| $H_2O$ | 25 |
| Tannic acid | 20 |
| Gelatin (type B, 90 bloom) | 15 |
| Glycerine | 52 |

Fifteen parts of high bloom type A gelatin is charged to a double-arm mixer and hydrated with 25 parts of water. The temperature is raised to 130° F., and 20 parts of tannic acid gradually added. The temperature of the batch rises to 170° F. by the time the addition of tannic acid is complete due to frictional heat generated in the mixture; 15 parts of low bloom type B gelatin is then gradually added and the mixture agitated until smooth and free of gelatin particles. 52 parts of glycerine is slowly added, with agitation, and the smooth, viscous product discharged from the mill.

The preparation of these adducts may be accomplished in types of equipment other than double-arm mixers. The materials may be made in heated vessels in which agitation is provided by turbine-, anchor-, or propeller-type stirrers. Examples of the use of such equipment for the preparation of gelatin-tannic acid adducts are given below.

Example 6

| | |
|---|---|
| Water | 12.5 |
| Glycerine | 26 |
| Gelatin (type B, 90 bloom) | 15 |
| Tannic acid | 10 |

12.5 parts of water and 26 parts of glycerine are placed in an electrically heated cylindrical glass vessel agitated by an electrically-driven anchor-type stirrer. 15 parts of low bloom type B gelatin is slowly added to the charge and agitated until the gelatin is thoroughly wetted and dispersed. Heat is then supplied to the vessel and the temperature is raised to 88° C., at which point 10 parts of tannic acid is added. After additional stirring the product is discharged. The cooled material is a soft, light colored gel identical in appearance and behavior with that described in Example 3.

In practicing the process shown in Example 6, other polymeric materials may be used, for example, high bloom type A gelatin, or starch. Propylene glycol may be substituted for the glycerine used in Example 6.

A single product combining the adducts of tannic acid with low bloom type B gelatin and of tannic acid with high bloom type A gelatin may also be prepared by the procedure given in Example 6, as shown below.

Example 7

| | |
|---|---|
| Water | 50 |
| Propylene glycol | 104 |
| Gelatin (type A, 275 bloom) | 30 |
| Tannic acid | 40 |
| Gelatin (type B, 90 bloom) | 30 |

50 parts of water and 104 parts of propylene glycol are charged to the stirred tank. 30 parts of high bloom type A gelatin is added slowly and the mixture agitated until the gelatin is thoroughly wetted and dispersed. The temperature is then raised to 85° C., at which point the mixture has the consistency of heavy cream. 40 parts of tannic acid is added slowly, with agitation, and dissolved in the fluid batch. 30 grams of low bloom type B gelatin is then sifted into the mixture and agitation continued until the product is smooth and homogeneous, and discharged at 75° C.

The above example illustrates that in such compositions containing both types of gelatin, it is more desirable to hydrate the type A gelatin first, saturate it with an excess of tannic acid, and then add type B gelatin which picks up whatever tannic acid has not bonded to the type A component. This example also illustrates the preferred order of mixing of these components or their equivalents.

As may be seen from the foregoing examples, agitation, and at times heat, are the major process requirements for preparing the polymer-tannic acid adducts. The amount of water or plasticizer employed, the structure of the plasticizer, the vessel in which the adduct is prepared, and the nature and molecular weight of the polymer used in conjunction with the tannic acid (or tannin) are all subject to wide variation. Such variations in the procedures employed or in the composition of the adducts produced do not constitute departures from the principle upon which the successful operation of the invention depends.

The following examples are presented to show how these materials may be employed to produce finished chewing gums which exhibit remarkably reduced tendencies to adhere to acrylic surfaces in the mouth as well as other tooth or dental structures, natural or synthetic. There are a number of ways in which tannic acid or water-soluble, hydrolyzable tannins or their adducts with polymeric substrates may be incorporated in the finished gum:

(1) Tannic acid may be added directly to the gum base during the last manufacturing step in quantities up to about 2.5–3%. Materials which contain tannic acid or other water soluble, hydrolyzable tannins may also be incorporated in the base in amounts such as that the final active tannin content is about 2.5–3% in the base, which latter is about 20% of the finished gum as illustrated below.

(2) Tannic acid or water soluble, hydrolyzable tannins may be added to the gum batch just prior to the addition of glucose at levels on a weight basis to give up to about 0.5% for tannic acid or about 1.0% for materials containing other water soluble, hydrolyzable tannins in lower proportions of active tannic acid materials.

(3) Tannic acid (or materials containing water soluble, hydrolyzable tannins) may be added to the gum batch in conjunction with finely powdered gelatin (205 bloom, mixed type A and type B, for example). When employed, in this manner, tannic acid equal to about 0.5% by weight of the gum batch is employed, together with the powdered gelatin in the amount of about 1.0%, based on the weight of the finished gum batch.

(4) Polymer-tannic acid adducts (or adducts of soluble, hydrolyzable tannins) may be added to the base or to the gum batch, with or without free tannic acid or soluble tannins.

A preferred method of incorporating these materials is illustrated by Example 8.

*Example 8*

| | |
|---|---|
| Gum base | 20.9 |
| Product of Ex. 2 | 1.3 |
| Product of Ex. 3 | 1.3 |
| Glucose (45° Bé.) | 20.1 |
| Confectioners' sugar | 55.2 |
| Corn sugar | 1.6 |
| Tannic acid | 0.1 |
| Glycerine | 1.6 |
| Flavor | 0.6 |

20.9 parts of gum base is softened by working in warm (122° F.) W&P mixer. 1.3 parts of high bloom type A gelatin-tannic acid adduct (see Example 2) and 1.3 parts of low bloom type B gelatin-tannic acid adduct (see Example 3) are added and thoroughly mixed with the softened base. 20.1 parts of 45° Bé. glucose is then added, followed by ⅔ of a mixture of 55.2 parts of confectioners' sugar and 1.6 parts of corn sugar. When these ingredients are well mixed, 1.6 parts of glycerine is added followed by the balance of the sugar-corn sugar mixture. Immediately thereafter, 0.1 part of tannic acid is added followed by 0.6 part of spearmint flavor. As soon as the last ingredients are thoroughly mixed, the batch is discharged, allowed to cool slightly, sheeted and scored in the usual fashion.

The gum base referred to above covers the non-nutritive, masticatory substance in chewing gum, so defined in the Federal Food, Drug and Cosmetic Act. In the regulation covering chewing gum ingredients under the Food Additives Amendment (see Federal Register, p. 4419, May 9, 1962), "paragraph (a) sets forth the ingredients permitted in chewing gum base under the regulation," and paragraph (c) defines the term "chewing gum base" as meaning "the manufactured or partially manufactured non-nutritive masticatory substance comprised of one or more of the ingredients named and so defined in paragraph (a) of this section." Examples of chewing gum bases are those given for example in F. T. De Angelis, 2,284,804, and R. L. Wilson, 2,137,746, both being U.S. patents.

Having thus disclosed my invention, I claim:

1. Chewing gum containing an effective amount of water soluble hydrolyzable tannin to give the gum abhesive action with respect to natural and artificial teeth and dental prosthetic devices and water-containing hydrophilic gel to regulate said action.

2. Chewing gum containing an effective amount of tannic acid–type A gelatin water-containing hydrophilic polymer gel to give abhesive properties to the chewing gum and polyhydric alcohol plasticizer in conjunction with the hydrophilic polymer gel.

3. Chewing gum containing an effective amount of tannic acid–type B gelatin water-containing hydrophilic polymer gel to give abhesive properties to the chewing gum and polyhydric alcohol plasticizer in conjunction with the hydrophilic polymer gel.

4. Chewing gum containing an effective amount of tannic acid–type A gelatin water-containing hydrophilic polymer gel and tannic acid–Type B gelatin water-containing hydrophilic polymer gel, and polyhydric alcohol plasticizer in conjunction with the hydrophilic polymer gels.

5. Chewing gum containing an effective amount of tannic acid–type A gelatin water-containing hydrophilic polymer gel and tannic acid–Type B gelatin water-containing hydrophilic polymer gel, and free tannic acid, and polyhydric alcohol plasticizer in conjunction with the hydrophilic polymer gel.

6. Chewing gum base containing an effective amount of water soluble tanning to give gum made therewith abhesive action with respect to natural and artificial teeth and dental prosthetic devices and water-containing hydrophilic polymer gel to depot said action.

7. A composition for producing chewing gum base containing an effective amount of tannic acid–type A gelatin water-containing hydrophilic polymer gel to give abhesive properties in chewing gum made with said base, and polyhydric alcohol plasticizer in conjunction with the hydrophilic polymer gel.

8. A composition for producing chewing gum base containing an effective amount of tannic acid–type B gelatin water-containing hydrophilic polymer gel to give abhesive properties in chewing gum made with said base, and polyhydric alcohol plasticizer in conjunction with the hydrophilic polymer gel.

9. A composition for producing chewing gum base containing an effective amount of tannic acid–type A gelatin water-containing hydrophilic polymer gel, tannic acid–type B gelatin water-containing hydrophilic polymer gel, and polyhydric alcohol plasticizer in conjunction with the hydrophilic polymer gel.

10. A composition for producing chewing gum base containing an effect amount of tannic acid–type A gelatin water-containing hydrophilic polymer gel, tannic acid–type B gelatin water-containing hydrophilic polymer gel, and free tannic acid, to give abhesive properties in chewing gum made with said base, and polyhydric alcohol plasticizer in conjunction with the hydrophilic polymer gel.

11. An abhesive additive for chewing gum use, of a water-soluble hydrolyzable tannin and a hydrophilic polymer gel to regulate the abhesive action, the ingredients being in effective amounts.

12. The additive of claim 11 in which the tannin is tannic acid.

13. The additive of claim 12 in which the polymer gel is of type A gelatin.

14. The additive of claim 12 in which the polymer gel is of type B gelatin.

15. The additive of claim 12 in which the polymer gel is of both type A gelatin and type B gelatin.

16. The additive of claim 12 in which the polymer gel is of type A gelatin and type B gelatin, and the additive contains free tannic acid.

17. Chewing gum as in claim 1 containing a polyhydric alcohol plasticizer in conjunction with the hydrophilic polymer gel.

18. The method of preparing water-soluble tannin-hydrophilic polymer gel useful in chewing gum products which consists essentially in agitating an aqueous paste of hydrophilic polymer with an effective amount of a water soluble tannin in an amount to give a substantially homogeneous water-containing gel having abhesive properties.

19. The method of claim 18 in which the polymer is polyvinyl alcohol and the tannin is tannic acid.

20. The method of claim 18 in which the polymer is starch and the tannin is tannic acid.

21. The method of claim 18 in which the polymer is methyl cellulose and the tannin is tannic acid.

22. The method of claim 18 in which the polymer is polyvinyl pyrrolidone and the tannin is tannic acid.

23. The method of claim 18 in which the polymer is type A gelatin and the tannin is tannic acid.

24. The method of claim 18 in which the polymer is type B gelatin and the tannin is tannic acid.

25. The method of claim 18 which includes the further step of incorporating a polyhydric alcohol plasticizer to improve the properties of the composition.

26. A chewing gum containing the following components in parts by weight:

| | |
|---|---|
| Gum base | 20.9 |
| High bloom type A gelatin-tannin hydrophilic polymer gel | 1.3 |
| Low bloom type B gelatin-tannin hydrophilic polymer gel | 1.3 |
| Glucose (45° Bé.) | 20.1 |
| Confectioners' sugar | 55.2 |
| Corn sugar | 1.6 |
| Tannic acid | 0.1 |
| Glycerine | 1.6 |
| Flavor | 0.6 | the high bloom type gelatin-tannin polymer gel containing:

| | |
|---|---|
| Gelatin (type A, 275 bloom) | 15 |
| Water | 12.5 |
| Tannic acid | 10 |
| Glycerine | 26 | and the low bloom type gelatin-tannin polymer gel containing:

| | |
|---|---|
| Gelatin (type B, 40 bloom) | 15 |
| Water | 12.5 |
| Tannic acid | 10 |
| Glycerine | 26 |

27. Chewing gum base containing hydrophilic polymer gel of the following constituents in the proportions by weight indicated:

| | |
|---|---|
| Water | 50 |
| Propylene glycol | 104 |
| Gelatin (type A, 275 bloom) | 30 |
| Tannic acid | 40 |
| Gelatin (type B, 90 bloom) | 30 |

28. Chewing gum base containing hydrophilic polymer gel of the following constituents in proportions by weight indicated:

| | |
|---|---|
| Water | 12.5 |
| Glycerine | 26 |
| Gelatin (type B, 90 bloom) | 15 |
| Tannic acid | 10 |

29. Chewing gum base containing hydrophilic polymer gel of the following constituents in the proportions by weight indicated:

| | |
|---|---|
| Gelatin (type A, 275 bloom) | 15 |
| $H_2O$ | 25 |
| Tannic acid | 20 |
| Gelatin (type B, 90 bloom) | 15 |
| Glycerine | 52 |

30. Chewing gum base containing hydrophilic polymer gel of the following constituents in the proportions by weight indicated:

| | |
|---|---|
| Gelatin | 30 |
| $H_2O$ | 25 |
| Dried, powdered extract of Douglas fir bark | 20 |
| Glycerine | 52 |

31. The method of making a chewing gum as set forth in claim 26 which comprises softening the gum base, mixing the softened base with the high bloom type A gelatin-tannic acid hydrophilic polymer gel and the low bloom type B gelatin-tannic hydrophilic polymer gel, adding and mixing therewith the glucose, a portion of a mixture of the confectioners' and corn sugars, then the glycerine and the balance of sugar mixture, followed by the tannic acid and by the flavor, mixing thoroughly, and sheeting.

32. The method of making chewing gum base as set forth in claim 27 which comprises softening the gum base and mixing the softened base with hydrophilic polymer gel produced as follows: mixing the water and propylene glycol, adding the high bloom type A gelatin, mixing to thoroughly wet and disperse the gelatin, heating the mixture to a consistency of a heavy cream, adding the tannic acid and mixing to dissolve it, sifting in the low bloom type B gelatin, agitating until homogeneous and discharging.

33. As an abhesive additive gel for chewing gum base of the following constituents in effective amounts by weight to regulate the abhesive action as follows:

| | |
|---|---|
| Water | 50 |
| Propylene glycol | 104 |
| Gelatin (type A, 275 bloom) | 30 |
| Tannic acid | 40 |
| Gelatin (type B, 90 bloom) | 30 |

34. As an abhesive additive gel for chewing gum base of the following constituents in effective amounts by weight to regulate the abhesive action as follows:

| | |
|---|---|
| Water | 12.5 |
| Glycerine | 26 |
| Gelatin (type B, 90 bloom) | 15 |
| Tannic acid | 10 |

35. As an abhesive additive gel for chewing gum base of the following constituents in effective amounts by weight to regulate the abhesive action as follows:

| | |
|---|---|
| Gelatin (type A, 275 bloom) | 15 |
| $H_2O$ | 25 |
| Tannic acid | 20 |
| Gelatin (type B, 90 bloom) | 15 |
| Glycerine | 52 |

36. As an abhesive additive gel for chewing gum base of the following constituents in effective amounts by weight to regulate the abhesive action as follows:

| | |
|---|---|
| Gelatin | 30 |
| $H_2O$ | 25 |
| Dried, powdered extract of Douglas fir bark | 20 |
| Glycerine | 52 |

37. As an abhesive additive gel for chewing gum base of the following constituents in effective amounts by weight to regulate the abhesive action as follows:

| | |
|---|---|
| Gelatin (type B, 90 bloom) | 30 |
| $H_2O$ | 25 |
| Tannic acid | 20 |
| Propylene glycol | 52 |

38. As an abhesive additive gel for chewing gum base of the following constituents in effective amounts by weight to regulate the abhesive action as follows:

| | |
|---|---|
| Gelatin (type B, 90 bloom) | 15 |
| $H_2O$ | 12.5 |
| Tannic acid | 10 |
| Glycerine | 26 |

39. As an abhesive additive gel for chewing gum base of the following constituents in effective amounts by weight to regulate the abhesive action as follows:

| | |
|---|---|
| Gelatin (type A, 275 bloom) | 15 |
| $H_2O$ | 12.5 |
| Tannic acid | 10 |
| Glycerine | 26 |

40. As an abhesive additive gel for chewing gum base of the following constituents in effective amounts by weight to regulate the abhesive action as follows:

| | |
|---|---|
| Polyvinyl alcohol | 30 |
| $H_2O$ | 55 |
| Tannic acid | 20 |

41. As an abhesive additive gel for chewing gum base of the following constituents in effective amounts by weight to regulate the abhesive action as follows:

| | |
|---|---|
| Cornstarch | 40 |
| H₂O | 25 |
| Tannic acid | 20 |

42. As an abhesive additive gel for chewing gum base of the following constituents in effective amounts by weight to regulate the abhesive action as follows:

| | |
|---|---|
| Methyl cellulose (15 cps.) | 15 |
| H₂O | 25 |
| Tannic acid | 20 |

43. As an abhesive additive gel for chewing gum base of the following constituents in effective amounts by weight to regulate the abhesive action as follows:

| | |
|---|---|
| Polyvinyl pyrrolidone | 30 |
| H₂O | 25 |
| Tannic acid | 20 |

44. Chewing gum as set forth in claim 1 containing a small amount of free tannic acid.

45. Chewing gum base as set forth in claim 6 containing a small amount of free tannic acid.

References Cited by the Examiner

UNITED STATES PATENTS

| | | | |
|---|---|---|---|
| 33,065 | 8/1861 | Hilton | 260—117 |
| 79,157 | 6/1868 | Sturgeon | 106—210 X |
| 658,747 | 10/1900 | Altschul | 260—117 |
| 894,277 | 7/1908 | Maywald | 260—473.5 |
| 1,474,140 | 11/1923 | Brown | 99—135 X |
| 2,306,415 | 12/1942 | Walker | 99—135 |
| 2,353,927 | 7/1944 | Pickett | 99—135 |
| 2,653,967 | 9/1953 | Monroe | 260—473.5 |

FOREIGN PATENTS 15,436    1886    Great Britain.

A. LOUIS MONACELL, *Primary Examiner.*

BEATRICE H. STRIZAK, *Examiner.*

R. N. JONES, *Assistant Examiner.*

UNITED STATES PATENT OFFICE
CERTIFICATE OF CORRECTION

Patent No. 3,255,018                                              June 7, 1966

Arthur J. Comollo

It is certified that error appears in the above identified patent and that said Letters Patent are hereby corrected as shown below:

Column 5, line 41, "G" should read -- B --. Column 9, line 31, "40 bloom" should read -- 90 bloom --; line 73, after "tannic" insert -- acid --.

Signed and sealed this 10th day of February 1970.

(SEAL)
Attest:

Edward M. Fletcher, Jr.                              WILLIAM E. SCHUYLER, JR.
Attesting Officer                                                 Commissioner of Patents